United States Patent
Ito

(10) Patent No.: US 7,943,224 B2
(45) Date of Patent: May 17, 2011

(54) ENDLESS BELT, BELT DEVICE AND IMAGE FORMING APPARATUS

(75) Inventor: Michiaki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 715 days.

(21) Appl. No.: 11/360,973

(22) Filed: Feb. 23, 2006

(65) Prior Publication Data
US 2006/0194011 A1    Aug. 31, 2006

(30) Foreign Application Priority Data

Feb. 25, 2005    (JP) .................. 2005-049984

(51) Int. Cl.
*G03G 15/16*    (2006.01)
*C08L 61/00*    (2006.01)
*C08G 73/02*    (2006.01)

(52) U.S. Cl. ......... 428/97; 428/35.7; 252/500; 399/297; 525/509; 525/540

(58) Field of Classification Search .............. 428/97, 428/32.7; 252/500; 399/297; 525/509, 540
See application file for complete search history.

(56) References Cited

U.S. PATENT DOCUMENTS

| | | | |
|---|---|---|---|
| 2001/0023015 A1* | 9/2001 | Matsuo et al. | 428/195 |
| 2003/0161668 A1* | 8/2003 | Hsieh et al. | 399/302 |
| 2004/0086694 A1* | 5/2004 | Ide | 428/195.1 |
| 2004/0105983 A1* | 6/2004 | Hattori et al. | 428/421 |
| 2004/0190941 A1* | 9/2004 | Thornton et al. | 399/159 |
| 2004/0208678 A1* | 10/2004 | Yoda et al. | 399/302 |

FOREIGN PATENT DOCUMENTS

| | | | |
|---|---|---|---|
| JP | 2002-014543 A | | 1/2002 |
| JP | 2004-087306 | * | 3/2004 |

OTHER PUBLICATIONS

Abstract of Foreign Application JP 2004-087306.*

* cited by examiner

*Primary Examiner* — Betelhem Shewareged
*Assistant Examiner* — Sathavaram I Reddy
(74) *Attorney, Agent, or Firm* — Panitch Schwarze Belisario & Nadel LLP

(57) ABSTRACT

An endless belt includes base resin, polyaniline, and alkyl imide acid. Alternatively, the endless belt includes base resin, polyaniline, and alkylsulfonic acid. With such an arrangement, it becomes possible to keep constant the electric resistance of the endless belt despite the change in circumstances or the change with the passage of time, and to thereby enhance the printing quality.

25 Claims, 2 Drawing Sheets

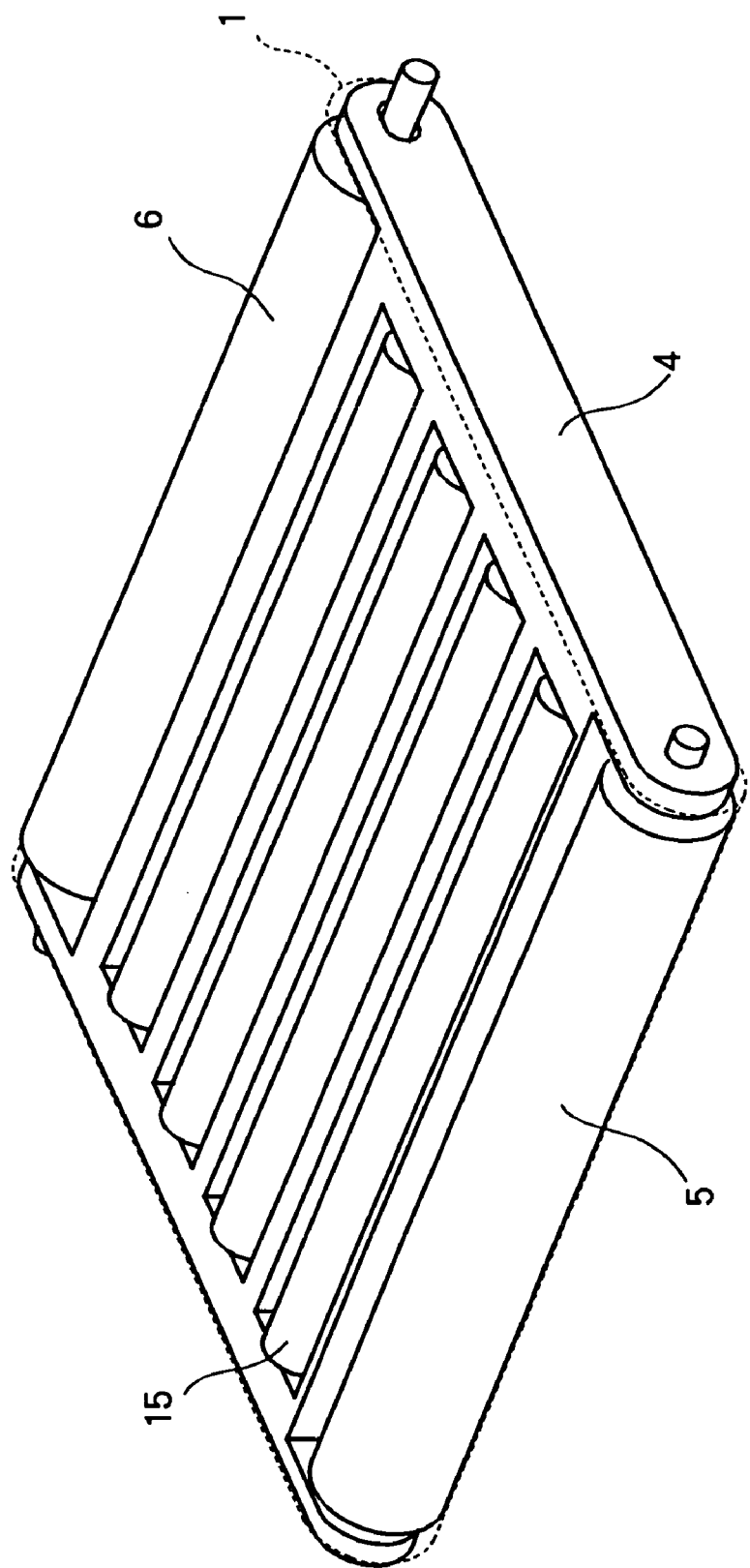

ENDLESS BELT, BELT DEVICE AND IMAGE FORMING APPARATUS

BACKGROUND OF THE INVENTION

This invention relates to an endless belt stretched around a plurality of rollers, and also relates to a belt device and an image forming apparatus (for example, an electrophotographic apparatus such as a copier, a facsimile, a printer or the like) using the belt.

A conventional image forming apparatus uses an endless belt containing carbon black as a conductivity imparting agent. Such an image forming apparatus is disclosed in, for example, Japanese Laid-Open Patent Publication No. 2002-14543 (see Page 2 and Table 2).

However, in the case where the endless belt containing carbon black is used, the aggregation or oxidization (or both of them) of the carbon black tends to occur because of the change in circumstances or the change with the passage of time. Thus, it is difficult to keep constant the electric resistance of the endless belt, and therefore it is difficult to obtain high printing quality.

SUMMARY OF THE INVENTION

An object of the present invention is to keep constant the electric resistance of an endless belt despite the change in circumstances or the change with the passage of time, and to thereby enhance the printing quality.

The present invention provides an endless belt including a base resin, polyaniline, and alkyl imide acid substituted by fluoro-base.

The present invention also provides an endless belt including a base resin, polyaniline, and alkylsulfonic acid.

With such an arrangement, it becomes possible to keep constant the electric resistance of the endless belt despite the change in circumstances or the change with the passage of time, and to thereby enhance the printing quality.

BRIEF DESCRIPTION OF THE DRAWINGS

In the attached drawings:

FIG. 2 is a perspective view of a belt device using the endless belt according to the embodiments of the present invention.

DETAILED DESCRIPTION OF THE PREFERRED EMBODIMENT

Figure 1:
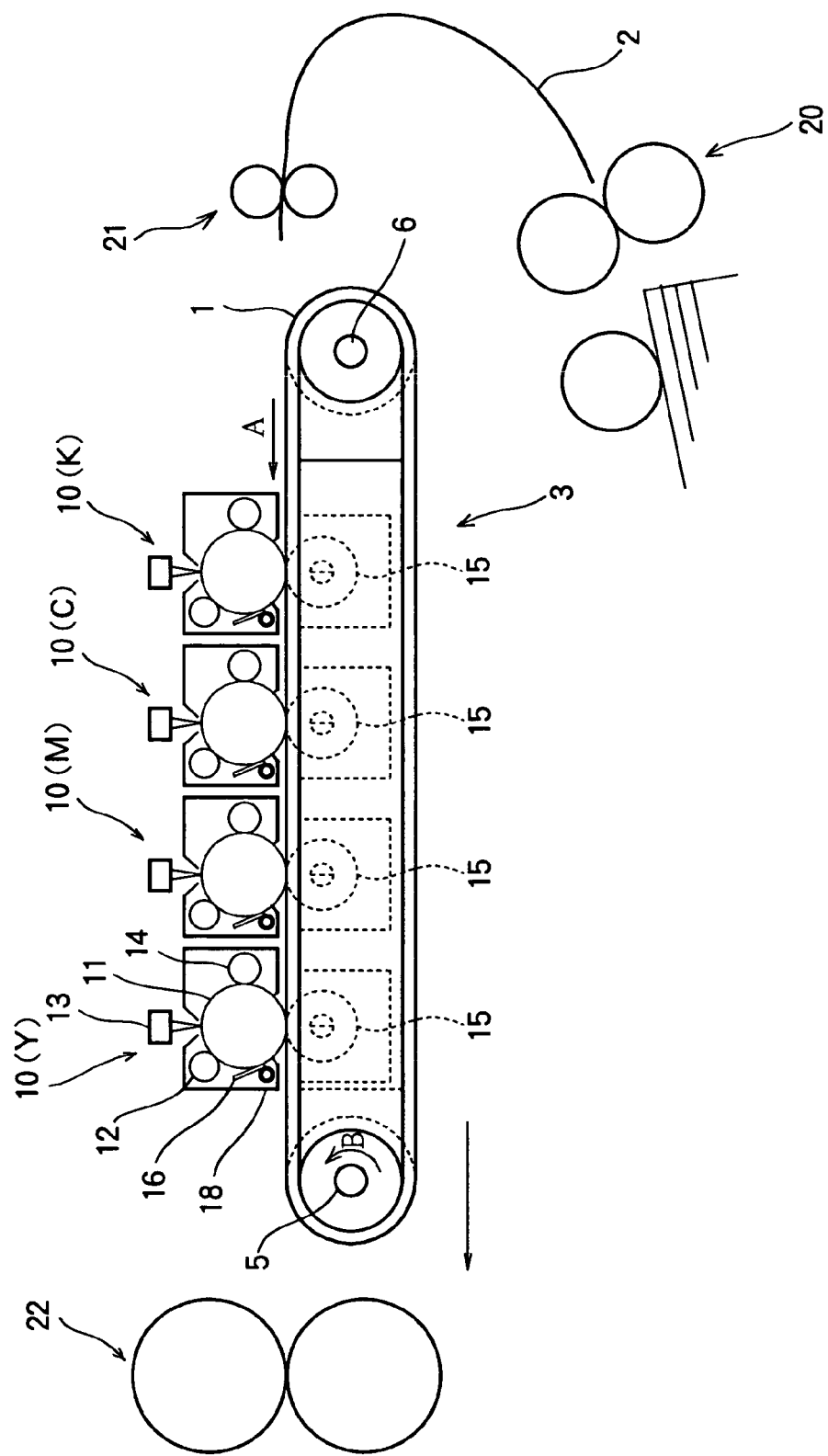
FIG. 1 is a side view of an image forming apparatus using an endless belt according to the embodiments of the present invention.

Embodiments of the present invention will be described with reference to the attached drawings.

First Embodiment

FIG. 1 is a side view illustrating a configuration of an image forming apparatus using an endless belt according to the first embodiment of the present invention. The image forming apparatus is an electrophotographic printer that prints an image with electrophotography. The image forming apparatus includes a belt device 3 having a drive roller 5, an idle roller 6 and an endless belt 1 stretched around the drive roller 5 and the idle roller 6. The drive roller 5 is driven by a not-shown motor and rotates counterclockwise as shown by an arrow B. By the rotation of the drive roller 5, the endless belt 1 moves (circulates) in the direction shown by an arrow A. The idle roller 6 is pushed in the direction away from the drive roller 5 by means of not-shown springs, and causes tension on the endless belt 1. Four transfer rollers 15 are arranged in a line between the drive roller 5 and the idle roller 6.

Above the transfer rollers 15, four toner image forming portions 10(Y), 10(M), 10(C) and 10(K) are disposed in opposition to the transfer rollers 15 so that the endless belt 1 is sandwiched between the image forming portions 10(Y), 10(M), 10(C) and 10(K) and the transfer rollers 15. Each of the toner image forming portions 10(Y), 10(M), 10(C) and 10(K) (collectively referred to as the toner image forming portion 10) includes a photosensitive body 11 in the shape of a cylinder that rotates clockwise in FIG. 1. Along the circumference of the photosensitive body 11, a charging device 12 that uniformly charges the surface of the photosensitive body 11, an exposing device 13 that exposes the surface of the photosensitive body 11 to the light to form a latent image thereon, a developing device 14 that develops the latent image on the surface of the photosensitive body 11 with toner to form a visualized image, and a cleaning blade 16 that removes the residual toner from the surface of the photosensitive body 11. A toner storing portion 18 is provided below the cleaning blade 16 for storing the waste toner. Each transfer roller 15 is given a voltage whose polarity is opposite to the toner adhering to the surface of the photosensitive body 11.

A feeding portion 20 is disposed on the lower side of the belt device 3 in FIG. 1. The feeding portion 20 feeds printing media 2 one by one to a feeding path. An alignment portion 21 is disposed on the feeding path of the printing medium 2 between the feeding portion 20 and the belt device 3. The alignment portion 21 corrects the skew of the printing medium 2 fed by the feeding portion 20 and feeds the printing medium 2 to the belt device 3. A fixing device 22 is disposed on the downstream side (i.e., the left side in FIG. 1) of the belt device 3. The fixing device 22 fixes the toner image (having been transferred to the printing medium 2) to the printing medium 2.

FIG. 2 is a perspective view of the belt device 3. As shown in FIG. 2, in the belt device 3, the drive roller 5, the idle roller 6 and the transfer rollers 15 are rotatably supported by a common belt frame 4. The drive roller 5 has a surface layer composed of a high friction material such as a rubber, and is rotated by a not-shown driving mechanism. The idle roller 6 is a driven roller that rotates in accordance with the movement of the endless belt 1 driven by the driving roller 5. In FIG. 2, the endless belt 1 is shown by a dashed line.

The operation of the image forming apparatus will be described with reference to FIG. 1. The feeding portion 20 feeds the printing medium 2. The alignment portion 21 corrects the skew of the printing medium 2, and feeds the printing medium 2 to the belt device 3. In the belt device 3, the drive roller 5 rotates, and the endless belt 1 moves (circulates) in the direction indicated by the arrow A, so that the printing medium 2 on the endless belt 1 passes the respective image forming portions 10. In the image forming portions 10, the toner images of the respective colors formed on the photosensitive bodies 11 are transferred to the printing medium 2 in series. The printing medium 2 (on which the toner image has been transferred) is carried downstream to the fixing device 22. In the fixing device 22, the printing medium 2 is heated and pressed, so that the toner image is fixed on the printing medium 2. After the toner image is fixed to the printing medium 2, the printing medium 2 is ejected through a not-shown ejection opening.

The composition of the endless belt 1 will be described.

The endless belt 1 is formed by mixing and agitating polyamide-imide (referred to as PAI) whose rate of ring-closure is 100%, poly-aniline (referred to as Pani), and bis-trifluoromethanesulfonyl-imide-acid (referred to as HTFSI) in solution of N-methyl-2-pyrrolidone (NMP), the weight ratio of solid content being:

PAI Pani:HTFSI=10:1:0.5

Then, the endless belt 1 is formed by centrifugal molding.

The endless belt 1 formed as above has a single layer structure. The thickness of the endless belt 1 is preferably in the range from 60 to 180 μm. In this example, the thickness of the endless belt 1 is 100 μm, and the inner diameter of an arcuate portion of the endless belt 1 wound around the drive roller 5 is 198 mm.

The weight ratio of solid content (PAI:Pani:HTFSI) is not limited to 10:1:0.5, and it is possible to employ other weight ratio of solid content. With respect to 10 weight parts of PAI, it is preferable that the solid content of Pani is in the range from 0.5 to 3 weight parts, and the solid content of HTFSI is in the range from 0.25 to 1.5 weight parts. Additionally, it is preferable that the solid content of Pani is double the solid content of HTFSI. Increase in the solid content of Pani causes increase in the cost of the endless belt, and may cause blooming (formation of insoluble part of the solid content on the surface). If the solid content of Pani is too low, desired electric conductivity is not imparted. For example, the weight ratio of solid content (PAI:Pani:HTFSI) can be 10:3:1.5, or 10:0.5: 0.25. By adjusting the weight ratio of solid content, it is possible to change the electric resistance of the endless belt 1. The selection of the weight ratio of solid content is made based on the electric resistance desired for the endless belt.

The above described polyamide-imide functions as a substrate of the endless belt 1. In terms of endurance and mechanical strength, it is preferable that the deformation of the endless belt 1 caused by the tension (when the endless belt 1 is driven) is in a certain range. In a particular example, the endless belt has Young's modulus preferably greater than or equals to 200 MPa, and more preferably greater than or equals to 300 MPa. In place of the above described polyamide-imide, it is also possible to use other material having Young's modulus greater than or equals to 200 MPa (more preferably, 300 MPa). For example, it is possible to use a resin such as polyimide, polycarbonate, polyamide, polyether-ether-ketone, poly-vinylidene fluoride, polyfluoroethylene-ethylene copolymer or the like.

The above described polyaniline is used for imparting electric conductivity to the endless belt 1. As polyaniline, solvent-soluble polyaniline is used. As the solvent, in place of the above described NMP, it is also possible to use Dimethyl-formaldehyde (DMAc) or tetrahydrofuran (THF).

The above described bis-trifluoromethanesulfonyl-imide-acid is a dopant for imparting further electric conductivity to the endless belt 1. In place of the above described bis-trifluoromethanesulfonyl-imide-acid, it is also possible to use other material corresponding to alkyl imide acid substituted by fluoro-base. Further, it is possible to use proton acid (hydrochloric acid, sulfuric acid or the like) or organic acid (acetic acid, benzoic acid, sulfone acid or the like).

Next, Examples of the first embodiment of the present invention and Comparative Examples will be described.

Example 1

The above described polyamide-imide, poly-aniline and bis-trifluoromethanesulfonyl-imide-acid are mixed and agitated in NMP solution, the weight ratio of solid content (PAI: Pani:HTFSI) being 10:1:0.5. The resulting material is formed (by centrifugal molding) in the form of the endless belt 1 of single layer structure having the thickness of 100 μm and the inner diameter of 198 mm. Polyamide-imide is preferable because of its durability, mechanical strength, and low cost compared with polyimide, and superiority and better balanced properties compared with polycarbonate. Poly-aniline is less costly and easy to acquire (readily available), and is easy to use. By the use of bis-trifluoromethanesulfonyl-imide-acid, the electric resistance can be maintained uniform and stable during molding, and during use, without regard to the environmental conditions, and despite the elapse of time.

Comparative Example 1

Polyamide-imide and poly-aniline are mixed and agitated in NMP solution, the weight ratio of solid content being 10:4. The resulting material is formed (by centrifugal molding) in the form of the endless belt having the thickness of 90 μm. Then, in order to form an inner layer of the endless belt, polyaniline is dissolved in NMP solution and is formed (by centrifugal molding) to a thickness of 10 μm. As a result, the endless belt having two layers is obtained. The endless belt has the total thickness of 100 μm, and has the inner diameter of 198 mm.

Comparative Example 2

Polyamide-imide and poly-aniline are mixed and agitated in NMP solution, the weight ratio of solid content being 10:4. The resulting material is formed (by centrifugal molding) in the form of the endless belt having the thickness of 100 μm and the inner diameter of 198 mm.

Comparative Example 3

Polyamide-imide, poly-aniline and dodecyl-benzene-sulfonic acid (DBS) as dopant are mixed and agitated in NMP solution, the weight ratio of solid content being 10:1:0.5. The resulting material is formed (by centrifugal molding) in the form of the endless belt having the thickness of 100 μm and the inner diameter of 198 mm.

Comparative Example 4

Polyimide of block copolymer and poly-aniline are mixed and agitated in NMP solution, the weight ratio of solid content being 10:4. The resulting material is formed (by centrifugal molding) in the form of the endless belt having the thickness of 90 μm. Then, in order to form an inner layer of the endless belt, polyaniline is dissolved in NMP solution and is formed (by centrifugal molding) to a thickness of 10 μm. As a result, the endless belt having two layers is obtained. The endless belt has the total thickness of 100 μm, and has the inner diameter of 198 mm.

Comparative Example 5

Polyimide and poly-aniline are mixed and agitated in NMP solution, the weight ratio of solid content being 10:4. The resulting material is formed (by centrifugal molding) in the form of the endless belt having the thickness of 100 μm and the inner diameter of 198 mm.

Comparative Example 6

Polyimide, poly-aniline and dodecyl-benzene-sulfonic acid (as dopant) are mixed in NMP solution, the weight ratio of solid content being 10:1:0.5. The resulting material is formed (by centrifugal molding) in the form of the endless belt having the thickness of 100 μm and the inner diameter of 198 mm.

Using the endless belts of Example 1 and the Comparative Examples 1 through 6, the volume resistivity and the surface resistivities (at the outer surface and the inner surface) are measured. The volume resistivity is measured on condition that the voltage of 250 V is applied to the endless belt, and the surface resistivities are measured on condition that the voltage of 500 V is applied to the endless belt, according to JIS-K6911. The result of the measurement is shown in Table 1.

TABLE 1

| Item | Volume Resistivity ($\Omega \cdot cm$: at 250 V) | Outer Surface Resistivity ($\Omega/\square$: at 500 V) | Inner Surface Resistivity ($\Omega/\square$: at 500 V) |
|---|---|---|---|
| Example 1 | $2.0 \times 10^{12}$ | $1.0 \times 10^{13}$ | $1.0 \times 10^{13}$ |
| Comparative Example 1 | $2.0 \times 10^{12}$ | $5.0 \times 10^{13}$ | $1.0 \times 10^{13}$ |
| Comparative Example 2 | $6.0 \times 10^{12}$ | $3.0 \times 10^{13}$ | $3.0 \times 10^{13}$ |
| Comparative Example 3 | $2.0 \times 10^{12}$ | $1.0 \times 10^{13}$ | $1.0 \times 10^{13}$ |
| Comparative Example 4 | $3.0 \times 10^{12}$ | $6.0 \times 10^{13}$ | $2.0 \times 10^{13}$ |
| Comparative Example 5 | $6.0 \times 10^{12}$ | $4.0 \times 10^{13}$ | $4.0 \times 10^{13}$ |
| Comparative Example 6 | $3.0 \times 10^{12}$ | $2.0 \times 10^{13}$ | $2.0 \times 10^{13}$ |

Further, using the endless belts of Example 1 and Comparative Examples 1 through 6, a printing test is carried out for evaluating a quality of the endless belt as a carrier of the printing medium. As a printing medium, a PPC (Plain Paper Copier) sheet is used. The printing test is carried out under the following conditions 1 through 3. The condition 1 is that the temperature is 10° C. and the humidity is 20%. The condition 2 is that the temperature is 23° C. and the humidity is 50%. The condition 3 is that the temperature is 28° C. and the humidity is 85%. As printing patterns, a halftone (whose density is 50%) and a solid pattern (whose density is 100%) are printed.

Under each of the above conditions, operation equivalent to printing of about 100,000 pages of A4-size paper is performed by rotating an endless belt having a length of 900 mm about 33,000 revolutions, and the volume resistivity and the surface resistivities (at the outer and inner surfaces) are measured. The result of the measurement is shown in Table 2.

TABLE 2

| Item | Volume Resistivity ($\Omega \cdot cm$: at 250 V) | Outer Surface Resistivity ($\Omega/\square$: at 500 V) | Inner Surface Resistivity ($\Omega/\square$: at 500 V) |
|---|---|---|---|
| Example 1 | $4.0 \times 10^{12}$ | $2.0 \times 10^{13}$ | $2.0 \times 10^{13}$ |
| Comparative Example 1 | $6.0 \times 10^{12}$ | $1.0 \times 10^{14}$ | $3.0 \times 10^{13}$ |
| Comparative Example 2 | $1.0 \times 10^{13}$ | $6.0 \times 10^{13}$ | $9.0 \times 10^{13}$ |
| Comparative Example 3 | $6.0 \times 10^{12}$ | $3.0 \times 10^{13}$ | $3.0 \times 10^{13}$ |
| Comparative Example 4 | $9.0 \times 10^{12}$ | $1.0 \times 10^{14}$ | $2.0 \times 10^{14}$ |
| Comparative Example 5 | $1.0 \times 10^{13}$ | $8.0 \times 10^{13}$ | $8.0 \times 10^{13}$ |
| Comparative Example 6 | $9.0 \times 10^{12}$ | $5.0 \times 10^{13}$ | $5.0 \times 10^{13}$ |

Additionally, the patterns printed on the printing medium in the printing test are visually observed to evaluate the transferring characteristics. Table 3 shows the evaluation result of the transferring characteristics just after the printing test has started. Table 4 shows the evaluation result of the transferring characteristics after operation equivalent to printing of about 100,000 pages of A4-size paper performed by rotating an endless belt having a length of 900 mm about 33,000 revolutions. In Tables 3 and 4, the mark "○" indicates that the transferring characteristics is excellent (i.e., uneven transferring is not observed), and the mark "X" indicates that the transferring characteristics is not excellent (i.e., uneven transferring is observed). The mark "Δ" indicates that the transferring characteristic is intermediate level between "○" and "X".

TABLE 3

| Item | Condition 1 (10° C., 20%) | Condition 2 (23° C., 50%) | Condition 3 (28° C., 85%) |
|---|---|---|---|
| Example 1 | ○/○ | ○/○ | ○/○ |
| Comparative Example 1 | ○/○ | ○/○ | Δ/Δ |
| Comparative Example 2 | ○/○ | ○/○ | ○/○ |
| Comparative Example 3 | ○/○ | ○/○ | ○/○ |
| Comparative Example 4 | ○/○ | ○/○ | Δ/Δ |
| Comparative Example 5 | ○/○ | ○/○ | ○/○ |
| Comparative Example 6 | ○/○ | ○/○ | ○/○ |

Evaluation Result With Halftone/With Solid Pattern

TABLE 4

| Item | Condition 1 (10° C., 20%) | Condition 2 (23° C., 50%) | Condition 3 (28° C., 85%) |
|---|---|---|---|
| Example 1 | ○/○ | ○/○ | ○/○ |
| Comparative Example 1 | ○/○ | ○/○ | X/X |
| Comparative Example 2 | Δ/Δ | ○/○ | ○/○ |
| Comparative Example 3 | Δ/Δ | ○/○ | ○/○ |
| Comparative Example 4 | ○/○ | ○/○ | X/X |
| Comparative Example 5 | Δ/Δ | ○/○ | ○/○ |
| Comparative Example 6 | Δ/Δ | ○/○ | ○/○ |

Evaluation Result With Halftone/With Solid Pattern

Moreover, after operation equivalent to printing of about 100,000 pages of A4-size paper performed by rotating an endless belt having a length of 900 mm about 33,000 revolutions, the rate of change in color displacement (i.e., displacement of patterns of the respective colors from one another) is measured. The rate of change in color displacement indicates how the positioning accuracy of the patterns of the respective colors (yellow, magenta, cyan and black) decreases, compared with the positioning accuracy (set to 100%) when the printing test starts. The change in color displacement is caused by the elongation of the endless belt, and therefore the rate of the change in color displacement is considered to be the same as the rate of elongation of the endless belt.

TABLE 5

| Item | Rate Of Change In Color Displacement | Warpage Under Circumstances OF High Temperature And High Humidity |
|---|---|---|
| Example 1 | <10% | ○ |
| Comparative Example 1 | 30% | X |
| Comparative Example 2 | 20% | X |
| Comparative Example 3 | <10% | ○ |
| Comparative Example 4 | 30% | X |
| Comparative Example 5 | 20% | X |
| Comparative Example 6 | <10% | ○ |

Furthermore, after operation equivalent to printing of about 100,000 pages of A4-size paper performed by rotating an endless belt having a length of 900 mm about 33,000 revolutions, the endless belt is kept in the circumstances of high temperature (70° C.) and high humidity (90%) for 72 hours, and then the warpage of the endless belt is measured. The result of the measurement is also shown in FIG. 5. In FIG. 5, the mark "○" indicates that no warpage (of a size that causes a problem in printing) exists. The mark "X" indicates that the warpage (of a size that causes a problem in printing) exists.

As shown in Tables 1 and 2, in Comparative Examples 1 and 4, there is a large difference between the surface resistivities of the outer and inner surfaces of the endless belt, with the result that the satisfactory transferring characteristics is not obtained (Tables 3 and 4). This is because the inner conductive layer (containing polyaniline) of the endless belt tends to absorb moisture. The absorption of moisture may cause the surface resistivity of the inner surface of the endless belt to decrease, and cause the electric field strength in a pre-nip portion (in which the printing medium closely approaches the photosensitive body) to increase, with the result that a gap discharge tends to occur. The gap discharge influences the outer surface of the endless belt, and deteriorates the transferring characteristics. Further, as shown in Table 5, there is a large deterioration in color displacement, and the warpage in the circumstances of high temperature and high humidity is large. This is because the moisture absorption characteristics of the inner conductive layer causes the warpage of the endless belt and causes the change in total length of the endless belt (which leads to the change in moving speed). Further, in Comparative Examples 1 and 4, there is a large increase in the electric resistance (i.e., the increase in the volume resistivity and the surface resistivity). This is because the inner conductive layer composed of polyaniline is softer than the substrate of the endless belt, and tends to wear by repeated printing operations. Further, the inner conductive layer is formed by centrifugal molding after the substrate has been formed, and the thickness of the conductive layer tends to vary, so that the irregular wear tends to occur.

As shown in Table 5, in Comparative Examples 2 and 5, there is a large deterioration in color displacement (after operation equivalent to printing of about 100,000 pages of A4-size paper performed by rotating an endless belt having a length of 900 mm about 33,000 revolutions), and the warpage in the circumstances of high temperature and high humidity is large. This is because the endless belt contains a large amount of polyaniline (which is soft, and has a small mechanical strength), and does not have a sufficient mechanical strength required in the electrophotographic process. In addition, since the endless belt contains a large amount of polyaniline which is high-cost material, the cost of the endless belt tends to increase.

As shown in Tables 1 and 2, in Comparative Examples 3 and 6, there is a large increase in the electric resistance (i.e., the increase in the volume resistivity and the surface resistivity) after operation equivalent to printing of about 100,000 pages of A4-size paper performed by rotating an endless belt having a length of 900 mm about 33,000 revolutions. This is because dodecyl-benzene-sulfonic acid (as dopant) has low heat resistance, and tends to volatilize and oxidize, so that the electric conductivity tends to decrease.

In contrast, in Example 1, as shown in Tables 1 and 2, there is a small difference between the surface resistivities of the outer and inner surfaces of the endless belt. Further, even after operation equivalent to printing of about 100,000 pages of A4-size paper performed by rotating an endless belt having a length of 900 mm about 33,000 revolutions, there is a small change in electric resistance. As a result, it is possible to obtain excellent transferring characteristics in any condition as shown in Tables 3 and 4. Furthermore, as shown in Table 5, there is a small deterioration (i.e., less than 10%) in color displacement after operation equivalent to printing of about 100,000 pages of A4-size paper performed by rotating an endless belt having a length of 900 mm about 33,000 revolutions, and the warpage does not occur. This is because the endless belt of Example 1 contains bis-trifluoromethane-sulfonyl-imide-acid as dopant to enhance the electric conductivity, and contains relatively small amount of polyaniline. With such a composition, it becomes possible to reduce the moisture-absorption (and to thereby reduce the change in characteristics with the passage of time), and to obtain sufficient flexibility and mechanical strength.

It is possible also to obtain the same advantage even when other alkyl imide acid substituted by fluoro-base is used in place of bis-trifluoromethanesulfonyl-imide-acid.

As described above, according to the first embodiment of the present invention, the endless belt includes the base resin (preferably, polyamide-imide), polyaniline and alkyl imide acid substituted by fluoro-base (preferably, bis-trifluoromethanesulfonyl-imide-acid) as dopant, and therefore it becomes possible to keep constant the electric resistance of the endless belt despite the change in circumstances (i.e., temperature or humidity) or the change with the passage of time, and thereby to enhance the printing quality.

Moreover, the endless belt has a single layer structure and has the thickness ranging from 60 to 180 μm, with the result that it is possible to further reduce the difference between the surface resistivities of the outer and inner surfaces, and to thereby further enhance the printing quality. Furthermore, the base resin (polyamide-imide) has Young's modulus greater than or equals to 200 MPa, and therefore it is possible to obtain sufficient endurance and mechanical strength required in electrophotographic process.

Second Embodiment

The second embodiment of the present invention is different from the first embodiment in the composition of the endless belt 1. The configurations of the image forming apparatus and the belt device in the second embodiment are the same as those of the image forming apparatus (FIG. 1) and the belt device (FIG. 2) described in the first embodiment.

The endless belt 1 of the second embodiment is formed by the mixing and agitating polyamide-imide (whose rate of ring-closure is 100%) as a base resin, poly-aniline, and dodecylsulfonic acid (referred to as DS) as dopant in NMP solution, the weight ratio of solid content being:

PAI:Pani:DS=10:1:0.5

Dodecylsulfonic acid is easy to acquire (readily available) and is less costly.

Further, the endless belt 1 is formed by the centrifugal molding as was described in the first embodiment.

The endless belt 1 has a single layer structure, and has the thickness preferably in the range from 60 to 180 μm. In this example, the thickness of the endless belt 1 is 100 μm, and the inner diameter of the arcuate portion of the endless belt 1 wound around the drive roller 5 is 198 mm.

The weight ratio of solid content (PAI:Pani:DS) is not limited to 10:1:0.5, and it is possible to employ other weight ratio of solid content. With respect to 10 weight parts of PAI, it is preferable that the solid content of Pani is in the range from 0.5 to 3 weight parts, and the solid content of DS is in the range from 0.25 to 1.5 weight parts. Additionally, it is preferable that the solid content of Pani is double the solid content of DS. Increase in the solid content of Pani causes increase in the cost of the endless belt. If the solid content of Pani is too low, desired electric conductivity is not imparted. For example, the weight ratio of solid content (PAI:Pani:DS) can be 10:3:1.5, or 10:0.5:0.25. By adjusting the weight ratio of solid content, it is possible to change the electric resistance of the endless belt 1. The selection of the weight ratio of solid content is made based on the electric resistance desired for the endless belt.

The above described dodecylsulfonic acid is a dopant for imparting further electric conductivity to the endless belt 1. In place of the above described dodecylsulfonic acid, it is also possible to use a material corresponding to alkylsulfonic acid.

Further, as was described in the first embodiment, in terms of endurance and mechanical strength, the base resin (polyamide-imide) of the endless belt 1 has Young's Modulus preferably greater than or equals to 200 MPa, and more preferably greater than or equals to 300 MPa. In place of the above described polyamide-imide, it is also possible to use other resin such as polyimide, polycarbonate, polyamide, poly-ether-ether-ketone, poly-vinylidene fluoride, polyfluoroethylene-ethylene copolymer or the like. As the polyaniline (for imparting electric conductivity to the endless belt 1), solvent-soluble polyaniline is used. As the solvent, it is also possible to use Dimethyl-formaldehyde (DMAc) or tetrahydrofuran (THF), in place of the above described NMP.

Next, Example of the second embodiment of the present invention and Comparative Example will be described.

Example 2

The above described polyamide-imide, poly-aniline and dodecylsulfonic acid are mixed in NMP solution, the weight ratio of solid content (PAI:Pani:DS) being 10:1:0.5. The resulting material is formed (by centrifugal molding) in the form of the endless belt 1 of single layer structure having the thickness of 100 μm and the inner diameter of 198 mm.

Comparative Example 7

Polyamic-acid (i.e., precursor of polyimide) and poly-aniline, and dodecylsulfonic acid (as dopant) are mixed in NMP solution, the weight ratio of solid content being 10:2:1. The resulting material is formed (by centrifugal molding) in the form of the endless belt having the thickness of 100 μm.

Using the endless belts of Example 2 and the Comparative Example 7, the volume resistivity and the surface resistivities (at the outer surface and the inner surface) are measured. The volume resistivity and the surface resistivities are measured as was described in the first embodiment, and in accordance with JIS-K6911. The result of the measurement is shown in Table 6.

TABLE 6

| Item | Volume Resistivity ($\Omega \cdot$ cm: at 250 V) | Outer Surface Resistivity ($\Omega/\square$: at 500 V) | Inner Surface Resistivity ($\Omega/\square$: at 500 V) |
| --- | --- | --- | --- |
| Example 2 | $2.0 \times 10^{12}$ | $1.0 \times 10^{13}$ | $1.0 \times 10^{13}$ |
| Comparative Example 7 | $3.0 \times 10^{12}$ | $2.0 \times 10^{13}$ | $2.0 \times 10^{13}$ |

Further, using the endless belts of Example 2 and Comparative Example 7, a printing test is carried out for evaluating a quality of the endless belt as a carrier of the printing medium. As a printing medium, a PPC sheet is used. The printing test is carried under the following conditions 1 through 3. The condition 1 is that the temperature is 10° C. and the humidity is 20%. The condition 2 is that the temperature is 23° C. and the humidity is 50%. The condition 3 is that the temperature is 28° C. and the humidity is 85%. As printing patterns, a halftone (whose density is 50%) and a solid pattern (whose density is 100%) are printed.

Under each of the above conditions, operation equivalent to printing of about 100,000 pages of A4-size paper is performed by rotating an endless belt having a length of 900 mm about 33,000 revolutions, and then the volume resistivity and the surface resistivities (at the outer surface and the inner surface) are measured. The result of the measurement is shown in Table 7.

TABLE 7

| Item | Volume Resistivity ($\Omega \cdot$ cm: at 250 V) | Outer Surface Resistivity ($\Omega/\square$: at 500 V) | Inner Surface Resistivity ($\Omega/\square$: at 500 V) |
| --- | --- | --- | --- |
| Example 2 | $3.0 \times 10^{12}$ | $1.6 \times 10^{13}$ | $1.6 \times 10^{13}$ |
| Comparative Example 7 | $7.0 \times 10^{12}$ | $5.0 \times 10^{13}$ | $5.0 \times 10^{13}$ |

Additionally, the patterns printed on the printing medium in the printing test are visually observed to evaluate the transferring characteristics. Table 8 shows the evaluation result of the transferring characteristics just after the printing test has started. Table 9 shows the evaluation result of the transferring characteristics after operation equivalent to printing of about 100,000 pages of A4-size paper performed by rotating an endless belt having a length of 900 mm about 33,000 revolutions. In Tables 8 and 9, the mark "○" indicates that the transferring characteristics is excellent, and the mark "X" indicates that the transferring characteristics is not excellent. The mark "Δ" indicates that the transferring characteristic is intermediate level between "○" and "X".

TABLE 8

| Item | Condition 1 (10° C. 20%) | Condition 2 (23° C. 50%) | Condition 3 (28° C. 85%) |
| --- | --- | --- | --- |
| Example 2 | ○/○ | ○/○ | ○/○ |
| Comparative Example 7 | ○/○ | ○/○ | ○/○ |

Evaluation Result With Halftone/With Solid Pattern

TABLE 9

| Item | Condition 1 (10° C. 20%) | Condition 2 (23° C. 50%) | Condition 3 (28° C. 85%) |
|---|---|---|---|
| Example 2 | O/O | O/O | O/O |
| Comparative Example 7 | Δ/Δ | O/O | O/O |

Evaluation Result With Halftone/With Solid Pattern

Moreover, after operation equivalent to printing of about 100,000 pages of A4-size paper performed by rotating an endless belt having a length of 900 mm about 33,000 revolutions, the rate of change in color displacement of the printed pattern is measured. Further, after operation equivalent to printing of about 100,000 pages of A4-size paper performed by rotating an endless belt having a length of 900 mm about 33,000 revolutions, the endless belt is kept in the circumstances of high temperature (70° C.) and high humidity (90%) for 72 hours, and then the warpage of the endless belt is measured. The results of the measurements are shown in FIG. 10. In FIG. 10, the mark "o" indicates that no warpage (of a size that causes a problem in printing) exists. The mark "X" indicates that the warpage (of a size that causes a problem in printing) exists.

TABLE 10

| Item | Rate of Change In Color Displacement | Warpage Under Circumstances OF High Temperature And High Humidity |
|---|---|---|
| Example 2 | <10% | O |
| Comparative Example 7 | <10% | O |

As shown in Tables 6 through 10, in Comparative Example 7, there is a large increase in the electric resistance (i.e., the increase in the volume resistivity and the surface resistivity) after operation equivalent to printing of about 100,000 pages of A4-size paper performed by rotating an endless belt having a length of 900 mm about 33,000 revolutions (Tables 6 and 7). This is because the heat generated by the conversion of polyamic acid into polyimide causes the dopant (i.e., dodecylsulfonic acid having low heat resistance) to volatilize and oxidize, so that the electric conductivity decreases. Further, the oxidization of the dopant is accelerated by mechanical and electrical fatigue of the endless belt as the printing operations are repeated.

In contrast, in the Example 2, even after operation equivalent to printing of about 100,000 pages of A4-size paper performed by rotating an endless belt having a length of 900 mm about 33,000 revolutions, there is a small increase in the electric resistance, and therefore it is possible to obtain excellent transferring characteristics in any condition as shown in Tables 6 and 7. This is because polyamide-imide (whose conversion from polyamic acid has already been completed) does not generate heat causing the dopant to volatilize and oxidize.

It is also possible to obtain the same advantage even when other alkylsulfonic acid is used in place of dodecylsulfonic acid.

In the above described Comparative Example 7, the transferring characteristics (Tables 8 and 9) is relatively excellent, the difference between the surface resistivities of the outer and inner surfaces is relatively small (Tables 6 and 7), and the change in color displacement and the warpage are both relatively small (Tables 10), compared with Comparative Examples 1 through 6 described in the first embodiment. This is because the use of dodecylsulfonic acid as the dopant provides a certain advantage in enhancing the printing quality.

As described above, according to the second embodiment of the present invention, the endless belt includes the base resin (preferably, polyamide-imide), polyaniline and alkylsulfonic acids (preferably, dodecylsulfonic acid) as the dopant, and therefore it becomes possible to keep constant the electric resistance of the endless belt despite the change in circumstances (temperature or humidity) or the change with the passage of time, and to thereby enhance the printing quality.

In the above described first and second embodiments, the endless belt is used as the carrier of the printing medium in the electrophotographic printer. However, the endless belt of the present invention can be used in any image forming apparatus that prints an image on a printing medium such as a copier, facsimile or printer.

While the preferred embodiments of the present invention have been illustrated in detail; it should be apparent that modifications and improvements may be made to the invention without departing from the spirit and scope of the invention as described in the following claims.

What is claimed is:

1. An endless belt comprising:
   a base resin;
   polyaniline; and
   alkyl imide acid substituted by fluoro-base,
   wherein the base resin, the polyaniline, and the alkyl imide acid substituted by fluoro-base are mixed with each other so that a solid content of the polyaniline is in a range of from 0.5 to 3 weight parts, and a solid content of the alkyl imide acid substituted by fluoro-base is in a range of from 0.25 to 1.5 weight parts, with respect to 10 weight parts of the base resin; and
   wherein said endless belt has a single layer structure.

2. The endless belt according to claim 1, wherein said alkyl imide acid substituted by fluoro-base is bis-trifluoromethane-sulfonyl-imide-acid.

3. The endless belt according to claim 1, wherein said base resin is polyamide-imide.

4. The endless belt according to claim 1, wherein said endless belt has Young's modulus greater than or equal to 200 MPa.

5. The endless belt according to claim 1, wherein said endless belt is formed by centrifugal molding.

6. The endless belt according to claim 1, wherein said endless belt has a thickness in a range from 60 to 180 μm.

7. A belt device comprising:
   said endless belt according to claim 1; and
   a plurality of rollers around which said endless belt is stretched.

8. An image forming apparatus comprising said endless belt according to claim 1, wherein the image forming apparatus is configured such that said endless belt is a carrier for a printing medium, and the printing medium is a carrier for toner.

9. The endless belt according to claim 1, wherein the solid content of the polyaniline is double the solid content of the alkyl imide acid substituted by fluoro-base.

10. The endless belt according to claim 1, wherein the alkyl imide acid substituted by fluoro-base is a different material than bis-trifluoromethanesulfonyl-imide-acid.

11. The endless belt according to claim 1, wherein the base resin comprises at least one selected from the group consisting of: polyimide, polycarbonate, polyamide, polyether-ether-ketone, polyvinylidene fluoride, and polyfluoroethylene-ethylene copolymer.

12. The endless belt according to claim 1, wherein the polyaniline is soluble in N-methyl-2-pyrrolidone, dimethyl-formaldehyde, or tetrahydrofuran.

13. The endless belt according to claim 1, wherein the base resin, the polyaniline, and the alkyl imide are mixed in N-methyl-2-pyrrolidone, dimethyl-formaldehyde, or tetrahydrofuran prior to formation of the endless belt.

14. An image forming apparatus, comprising:
an endless belt carrying a printing medium; and
a plurality of rollers around which said endless belt is stretched,
wherein the image forming apparatus is configured such that said endless belt is a carrier for the printing medium, and the printing medium is a carrier for toner, and
wherein the endless belt comprises:
a base resin;
polyaniline; and
alkyl imide acid substituted by fluoro-base,
wherein the base resin, the polyaniline, and the alkyl imide acid substituted by fluoro-base are mixed with each other so that a solid content of the polyaniline is in a range of from 0.5 to 3 weight parts, and a solid content of the alkyl imide acid substituted by fluoro-base is in a range of from 0.25 to 1.5 weight parts, with respect to 10 weight parts of the base resin.

15. The image forming apparatus according to claim 14, wherein said alkyl imide acid substituted by fluoro-base is bis-trifluoromethanesulfonyl-imide-acid.

16. The image forming apparatus according to claim 14, wherein said base resin is polyamide-imide.

17. The image forming apparatus according to claim 14, wherein said endless belt has a single layer structure.

18. The image forming apparatus according to claim 14, wherein said endless belt has Young's modulus greater than or equal to 200 MPa.

19. The image forming apparatus according to claim 14, wherein said endless belt is formed by centrifugal molding.

20. The image forming apparatus according to claim 14, wherein said endless belt has a thickness in a range from 60 to 180 µm.

21. The image forming apparatus according to claim 14, wherein the solid content of the polyaniline is double the solid content of the alkyl imide acid substituted by fluoro-base.

22. The image forming apparatus according to claim 14, wherein the alkyl imide acid substituted by fluoro-base is a different material than bis-trifluoromethanesulfonyl-imide-acid.

23. The image forming apparatus according to claim 14, wherein the base resin comprises at least one selected from the group consisting of: polyimide, polycarbonate, polyamide, polyether-ether-ketone, polyvinylidene fluoride, and polyfluoroethylene-ethylene copolymer.

24. The image forming apparatus according to claim 14, wherein the polyaniline is soluble in N-methyl-2-pyrrolidone, dimethyl-formaldehyde, or tetrahydrofuran.

25. The image forming apparatus according to claim 14, wherein the base resin, the polyaniline, and the alkyl imide are mixed in N-methyl-2-pyrrolidone, dimethyl-formaldehyde, or tetrahydrofuran prior to formation of the endless belt.

* * * * *